United States Patent [19]
Konishi

[11] Patent Number: 5,301,273
[45] Date of Patent: Apr. 5, 1994

[54] METHOD AND APPARATUS FOR MANAGING ADDRESS INFORMATION UTILIZED IN MESSAGE TRANSMISSION AND RECEPTION

[75] Inventor: Kuniyoshi Konishi, Tokyo, Japan

[73] Assignee: Kabushiki Kaisha Toshiba, Kawasaki, Japan

[21] Appl. No.: 717,063

[22] Filed: Jun. 18, 1991

[30] Foreign Application Priority Data

Jun. 18, 1990 [JP] Japan .................. 2-157654

[51] Int. Cl.$^5$ ............................. G06F 13/00
[52] U.S. Cl. .................. 395/200; 370/85.13
[58] Field of Search ............ 395/200; 370/85.13, 370/85.14, 60, 61, 92, 93; 364/284.4, 284.3, 242.94, 242.5, 927.92, 927.95, 940.61, 974, 974.2

[56] References Cited

U.S. PATENT DOCUMENTS

| | | | |
|---|---|---|---|
| 4,287,592 | 9/1981 | Paulish et al. | 370/92 |
| 4,597,078 | 6/1986 | Kempf | 370/85.13 |
| 4,627,052 | 12/1986 | Hoore et al. | 370/85.13 |
| 4,737,953 | 4/1988 | Koch et al. | |
| 4,947,390 | 8/1990 | Sheehy | 370/85.13 |
| 5,088,032 | 2/1992 | Bosack | 395/200 |

FOREIGN PATENT DOCUMENTS

0365337  4/1990  European Pat. Off. .

OTHER PUBLICATIONS

IEEE Global Telecommunications Conference, vol. 3, Nov. 28, 1988, pp. 1791–1797, XP43016 D. Japel, et al., "LAN/ISDN Interconnect via Frame Relay".

Ire Wescon Convention Record, vol. 33, Nov. 1989, pp. 235–239, XP116012, Z. Amitai "Address Filtering in FDDI Lan Bridges (The Cam Solution)".

IEEE Network, Floyd Backes; Jan. 1988–vol. 2, No. 1 "Spanning Tree Bridges Transparent Bridges for Interconnection of IEEE"–802 LANs.

*Primary Examiner*—Dale M. Shaw
*Assistant Examiner*—Moustafa M. Meky
*Attorney, Agent, or Firm*—Oblon, Spivak, McClelland, Maier & Neustadt

[57] ABSTRACT

In a bridge unit for connecting branch LANs through a trunk LAN, of address information registered in an address translation table, address information associated with a station not subjected to message transmission or reception for a predetermined period of time is recognized as address information to be deleted from the address translation table After this recognization, when a message is to be transmitted to a destination station represented by the station address included in the address information to be deleted, message transmission is performed by using the address information to be deleted When a response message is not received from the destination station, the address information to be deleted is deleted from the address translation table, and the message is retransmitted by broadcast.

11 Claims, 11 Drawing Sheets

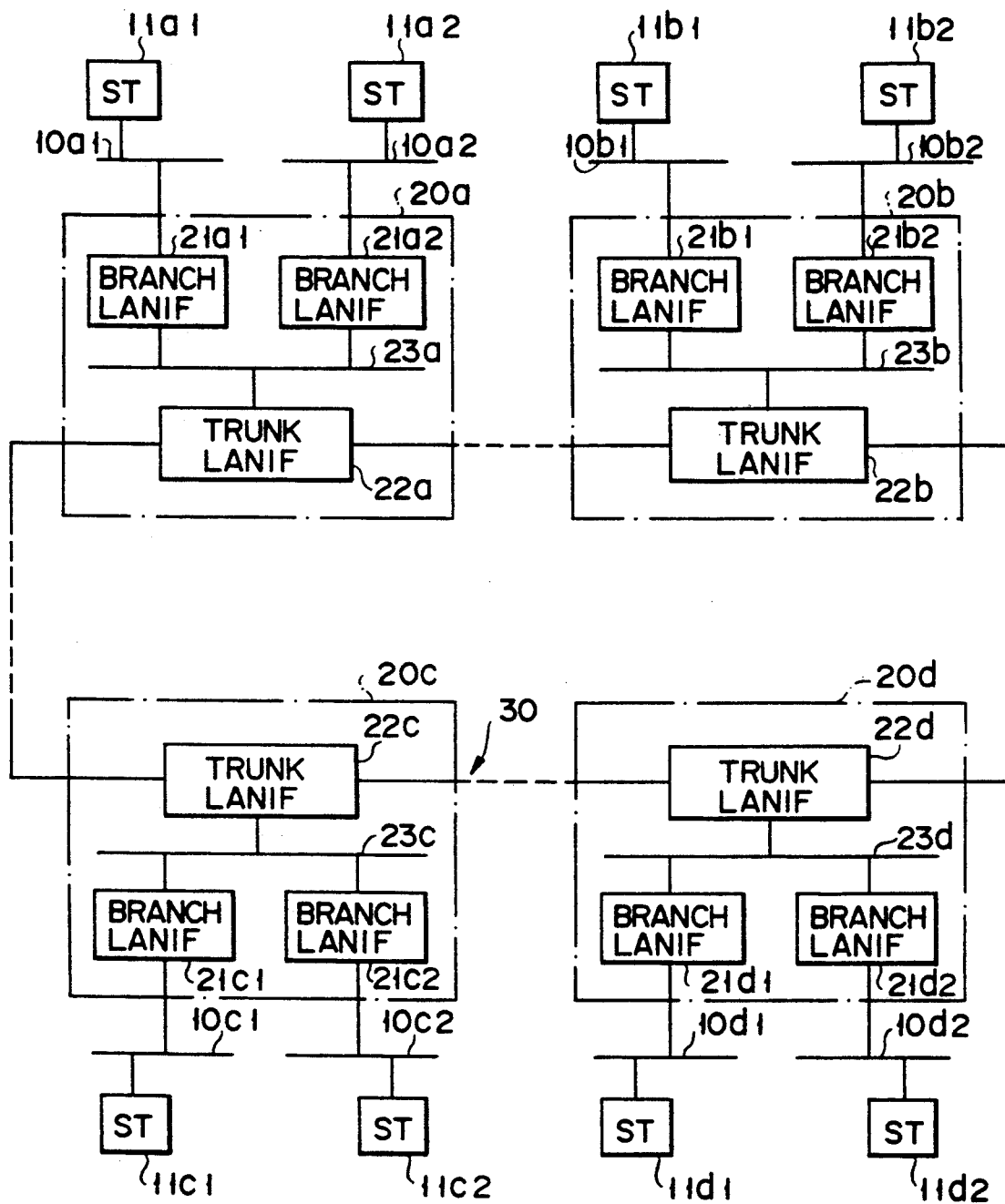
F I G. 1

| ENTRY NUMBER | R | A | T | STATION ADDRESS | BRIDGE PORT ADDRESS | TIMER VALUE |
|---|---|---|---|---|---|---|
| 0 | 1 | 0 | 0 | 0 0 0 0 0 0 0 0 1 | 0 0 0 0 0 0 0 0 0 2 | 0 0 0 1 |
| 1 | 1 | 1 | 0 | 0 0 0 0 0 0 0 0 2 | 0 0 0 0 0 0 0 0 0 5 | 9 9 9 1 |
| 2 | 1 | 0 | 0 | 0 0 0 0 0 0 0 0 3 | 0 0 0 0 0 0 0 0 0 7 | 0 8 8 2 |
| 3 | 1 | 1 | 1 | 0 0 0 0 0 0 0 0 4 | 0 0 0 0 0 0 0 0 0 1 | 0 0 7 1 |
| 4 | 1 | 0 | 0 | 0 0 0 0 0 0 0 0 5 | 0 0 0 0 0 0 0 0 0 4 | 0 0 6 1 |
| 5 | 1 | 0 | 0 | 0 0 0 0 0 0 0 0 6 | 0 0 0 0 0 0 0 0 0 3 | 5 4 3 2 |
| 6 | 1 | 0 | 0 | 0 0 0 0 0 0 0 0 7 | 0 0 0 0 0 0 0 0 0 5 | 0 0 0 2 |
| 7 | 1 | 0 | 0 | 0 0 0 0 0 0 0 0 8 | 0 0 0 0 0 0 0 0 0 2 | 0 0 0 4 |

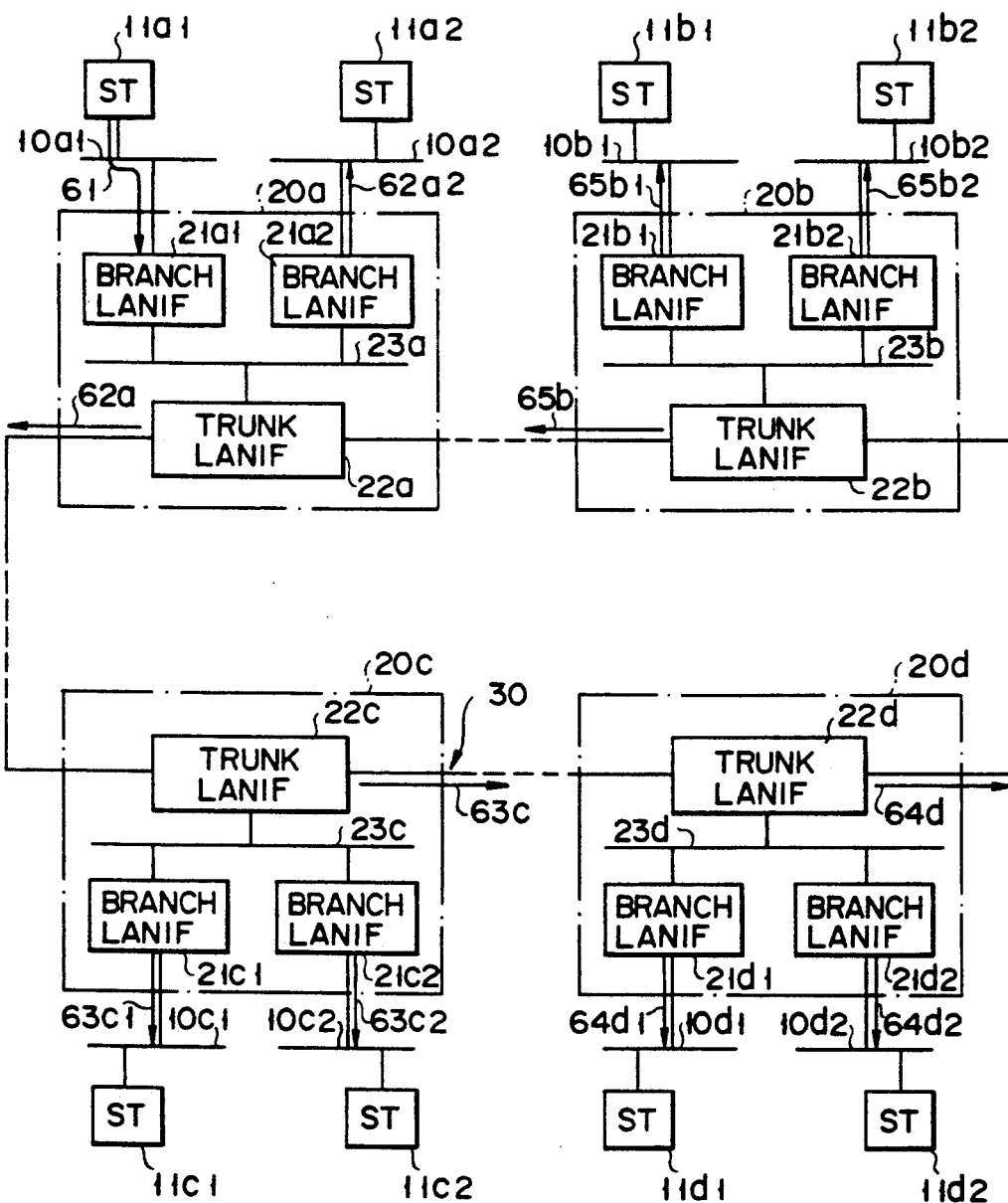
F I G. 12

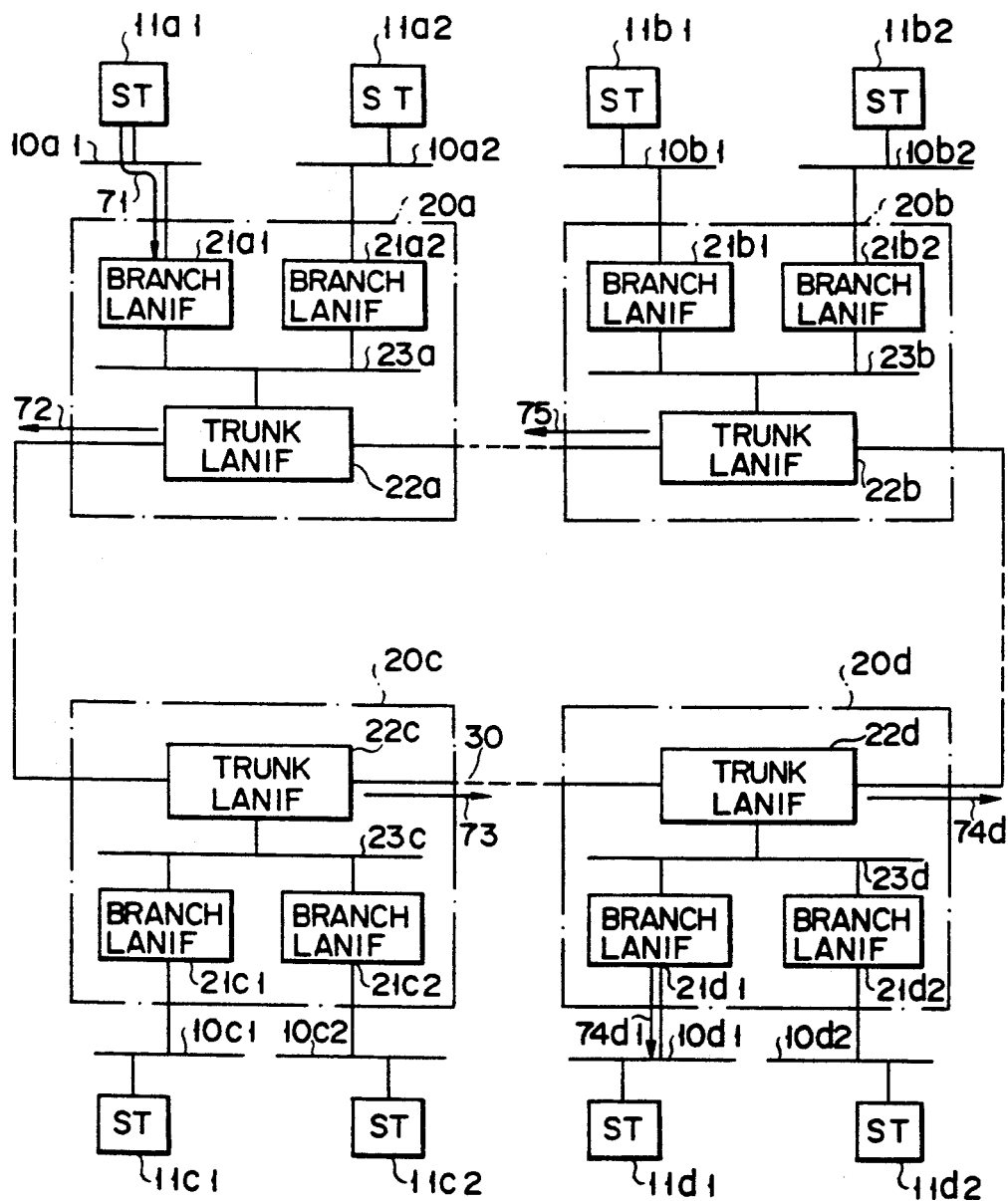
F I G. 13

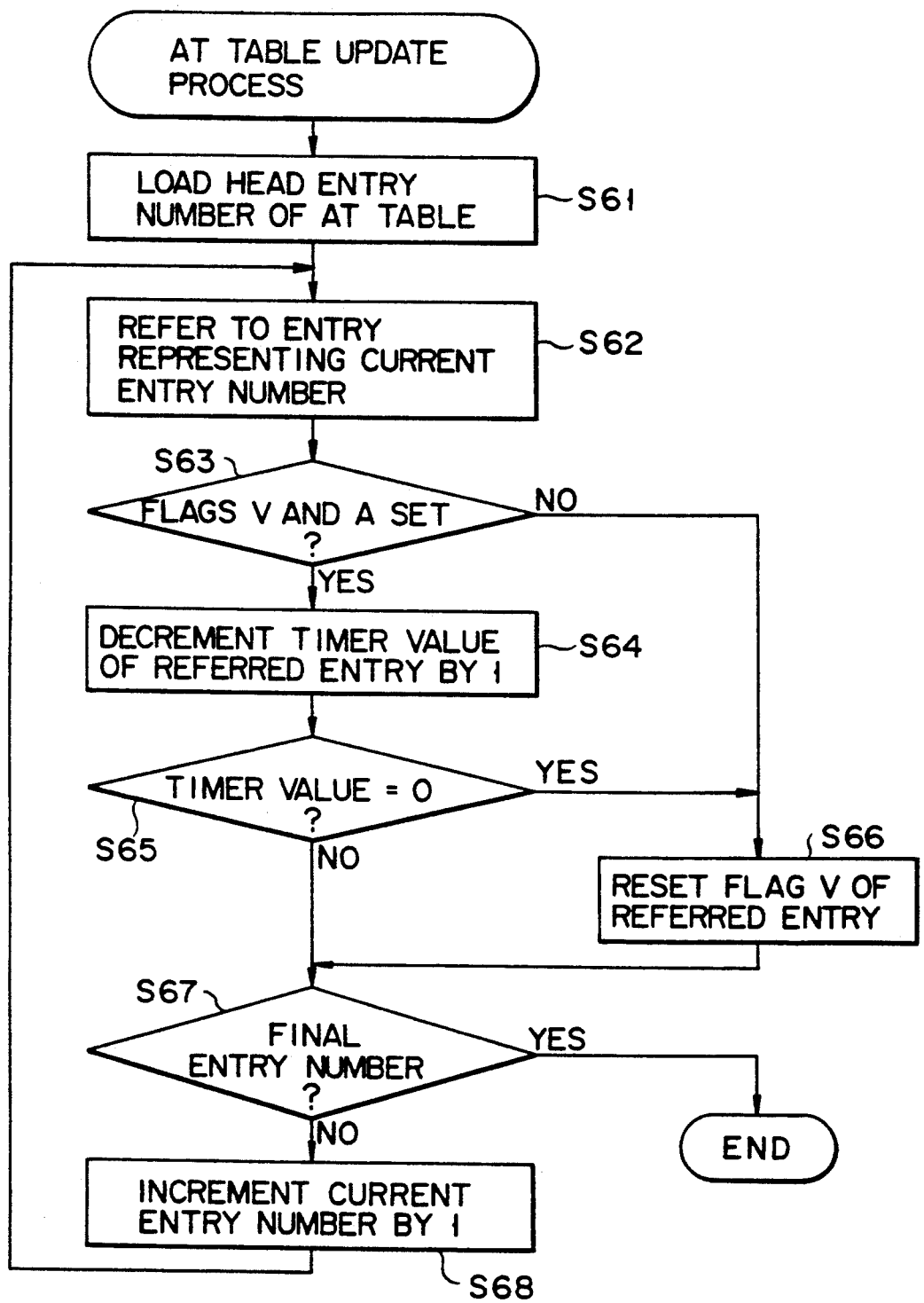
F I G. 14

METHOD AND APPARATUS FOR MANAGING ADDRESS INFORMATION UTILIZED IN MESSAGE TRANSMISSION AND RECEPTION

BACKGROUND OF THE INVENTION

1. Field of the Invention

The present invention relates to a method and apparatus for managing address information utilized in message transmission and reception.

2. Description of the Related Art

In a conventional network system wherein a plurality of branch LANs (Local Area Networks) are connected to each other through a trunk LAN by a plurality of bridge units, when a message is to be transmitted from a station on a predetermined branch LAN to a station on another branch LAN, it is necessary not to transmit this message to branch LANs not associated with message transmission. For this purpose, the message must be transmitted using address information including a pair of a station address of the station on the branch LAN and a bridge port address of an interface of the bridge unit to which this branch LAN is connected. In general, the address pair are registered in an address translation table by a hash method or the like, and when the message is transmitted from the predetermined station to another station by broadcast, or its response message is to be transmitted, the address pair are automatically changed.

Each station of the network system is not always permanently connected to a desired branch LAN and may be connected to the station of another branch LAN upon movement of the station. In this case, the bridge port address associated with the station address is changed. When the address information of the moved station is information prior to movement and registered in the address translation table, the message is transmitted to the branch LAN connected to the station prior to the movement. In this case, a response message is not transmitted from the destination station. In general, when a response message is not received, the same transmission message is repeatedly transmitted. When no response message is received upon a lapse of a predetermined period of time, error processing is performed. If retry or error processing is performed upon movement of the destination station, transmission efficiency of the entire network system is degraded, and a load on the network system is undesirably increased.

When a station is moved in a conventional network system, this station will not be used for a predetermined period of time. A station which does not receive or transmit a message for a predetermined period of time is recognized as a moved station (or failed station), and the address information not utilized for the predetermined period of time is deleted from the address translation table.

According to this conventional method address information associated with a station which is not frequently used in a network system is deleted from the address translation table in addition to the address information associated with the moved station. After deletion of the address information, since a message for this station is transmitted by broadcast, this message is also transmitted to branch LANs not associated with the current message transmission, thus undesirably increasing the load of the network.

Strong demand therefore has arisen for an apparatus capable of transmitting a message to a desired station by utilizing the address information associated with the desired station not subjected to message transmission/reception for the predetermined period of time without immediately deleting this address information from the address translation table.

SUMMARY OF THE INVENTION

It is an object of the present invention to provide a method and apparatus for managing address information utilized in message transmission and reception.

According to the present invention, in a bridge unit for connecting branch LANs each other through a trunk LAN, of address information registered in an address translation table, address information associated with a station not subjected to message transmission/reception for a predetermined period of time is recognized as address information to be deleted from the address translation table.

The address information to be deleted is recognized as follows. The address information includes a timer value initialized at the time of registration and utilization of the address information. The address information in the address translation table is referred to every predetermined period of time. Every time the address information is referred to, the corresponding timer value is decremented by, e.g., one. The timer value of address information which is not used for a long period of time becomes zero. Therefore, the address information not utilized for a predetermined period of time can be recognized.

In the conventional system, when a timer value becomes zero, the corresponding address information is deleted from the address translation table. According to the present invention, however, this address information is not deleted upon this time. When a message is to be transmitted to a destination station represented by a station address included in this address information which is recognized not to have been utilized for a long period of time, message transmission is performed using this address information.

When address information is not utilized for a predetermined period of time due to a low frequency of utilization of a destination station, a message transmitted using this address information is received by the destination station, and a response message is transmitted from the destination station to a source station. For this reason, message transmission to branch LANs not associated with the current message transmission can be prevented.

When address information is not utilized for a predetermined period of time due to movement or failure of a destination station, a response message corresponding to the message transmitted using this address information is not received. In this case, the address information is deleted from the address translation table, and the message is transmitted again by broadcast.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of invention.

FIG. 1 is a diagram showing a configuration of a network system according to an embodiment of the present invention;

FIG. 12 is a block diagram for explaining a flow of the first message transmitted between predetermined stations in the network system shown in FIG. 1;

FIG. 13 is a block diagram for explaining a flow of the nth message transmitted between the predetermined stations in the network system shown in FIG. 1; and FIG. 14 is a flow chart showing address translation table update processing in a branch LAN interface.

DETAILED DESCRIPTION OF THE PREFERRED EMBODIMENTS

A preferred embodiment of the present invention will be described with reference to the accompanying drawings.

FIG. 1 is a block diagram showing a configuration of a network system according to an embodiment of the present invention. Referring to FIG. 1, the network system comprises middle- or low-speed branch LANs $10_{a1}$, $10_{a2}$, $10_{b1}$, $10_{b2}$, $10_{c1}$, $10_{c2}$, $10_{d1}$, and $10_{d2}$, stations (STs) $11_{a1}$, $11_{a2}$, $11_{b1}$, $11_{b2}$, $11_{c1}$, $11_{c2}$, $11_{d1}$, and $11_{d2}$, bridge units $20_a$, $20_b$, $20_c$, and $20_d$, and a high-speed trunk LAN 30. The branch LANs $10_{a1}$, $10_{a2}$, $10_{b1}$, $10_{b2}$, $10_{c1}$, $10_{c2}$, $10_{d1}$, and $10_{d2}$ are connected to each other through the bridge units $20_a$, $20_b$, $20_c$, and $20_d$ and the trunk LAN 30.

The bridge unit $20_a$ comprises branch LAN interfaces (branch LANIFs) $21_{a1}$ and $21_{a2}$, a trunk LAN interface (trunk LANIF) $22_a$, and an internal bus $23_a$.

The branch LANIFs $21_{a1}$ and $21_{a2}$ can transmit and receive a message to and from the STs $11_{a1}$ and $11_{a2}$ respectively connected to the branch LANs $10_{a1}$ and $10_{a2}$. The trunk LANIF $22_a$ can transmit and receive a message to and from the trunk LAN 30. The internal bus $23_a$ is used to allow message transmission and reception between the branch LANIFs $21_{a1}$ and $21_{a2}$ and the trunk LANIF $22_a$. The other bridge units $20_b$ to $20_d$ are arranged as in the bridge unit $20_a$.

An inherent bridge port address is assigned to each interface. This bridge port address comprises a 1-digit bridge address for distinguishing a bridge unit, and a 1-digit port address for distinguishing an interface included in this bridge unit. The upper digit represents the bridge address.

Figures 2, 3:
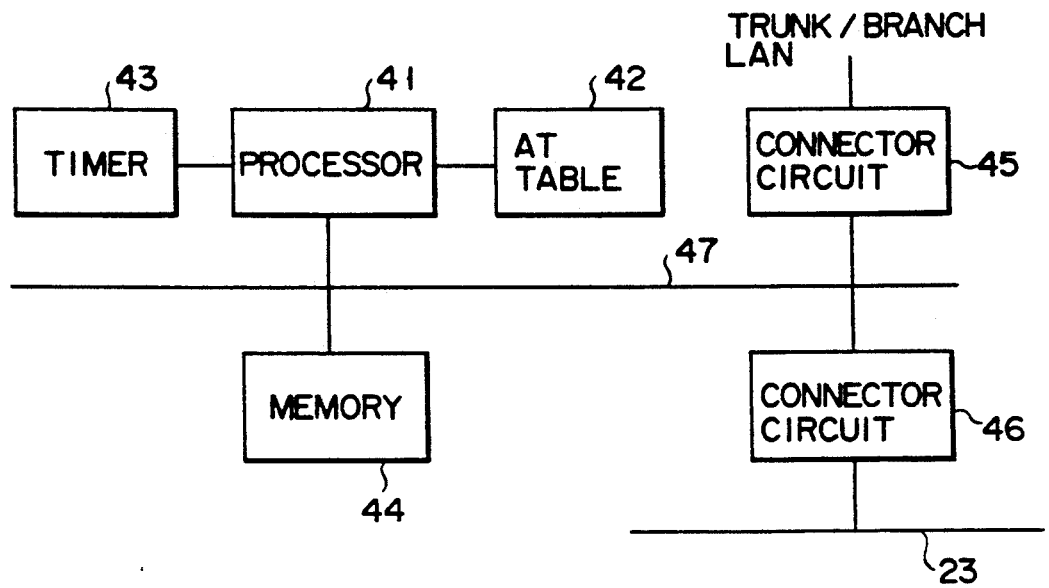
FIG. 2 is a block diagram showing an arrangement of an interface arranged in a bridge unit shown in FIG. 1.
FIG. 3 is a view showing the content of an address translation (AT) table shown in FIG. 2.

FIG. 2 is a block diagram showing an arrangement of each LAN interface in each of the bridge units $20_a$, $20_b$, $20_c$, and $20_d$. Each LAN interface comprises a processor 41, an address translation (AT) table 42, a timer 43, a memory 44, connector circuits 45 and 46, and an interface internal bus 47.

The processor 41 performs overall control of the interface and address translation processing (to be described later). The AT table 42 registers address information having station addresses and bridge port addresses corresponding to the station addresses. The AT table 42 is accessed by only the processor 41. The timer 43 is used to execute an interrupt to the processor 41 every predetermined period of time. By this interrupt from the timer 43, the AT table 42 is updated.

The memory 44 is used to store a message exchanged between the LANs. The connector circuit 45 has a transmitter/receiver circuit (not shown) and transmits or receives a message to or from the LAN. The connector circuit 46 has a transmitter/receiver circuit (not shown) and transmits or receives a message to or from the internal bus 23 in the bridge unit. The interface internal bus 47 is used to connect the processor 41, the memory 44, and the connector circuits 45 and 46.

The transmitter/receiver circuit arranged in the connector circuit 45 of the branch LAN interface receives all messages transmitted on the branch LAN. The transmitter/receiver circuit arranged in the connector circuit 46 receives only a broadcast message transmitted onto the internal bus of the bridge unit or a message to the self-interface.

The transmitter/receiver circuit arranged in the connector circuit 45 of the trunk LAN interface receives a broadcast message on the trunk LAN or a message to the self-bridge unit. The transmitter/receiver circuit arranged in the connector circuit 46 receives the broadcast message on the internal bus or a message to only other bridge units without the self-interface.

The trunk LAN can perform high-speed message transmission. However, when the AT table 42 is used in the trunk LAN interface, it takes time to determine address information, thereby degrading transmission efficiency. For this reason, the AT table 42 need not be used. In this embodiment, the AT table 42 is not included in the trunk LAN interface. In this case, since the timer 43 need not be used either, the processor 41 performs control for normal message transmission and reception.

FIG. 3 is a view showing contents of the AT table 42. As shown in FIG. 3, each of entries of the AT table 42 has destination and source station addresses, bridge port addresses corresponding thereto, a timer value used to manage validity/invalidity of each entry, and three types of flags. These flags comprise a flag V representing whether the content of the entry, i.e., the address information is valid, a flag A representing whether the address pair of the entry are utilized within a predetermined period of time to transmit a message, and a flag R. The flag R represents whether the address pair are utilized in message transmission when the flag V is set and the flag A is reset.

When an address pair of a desired entry is not used for message transmission within a predetermined period of time, the address information in the entry is deleted even if the entry is valid in the conventional system. In this embodiment, however, prior to deletion of the address information, it is determined whether message transmission by the address pair is performed, in accordance with a set/reset state of the flag R.

Figure 4:
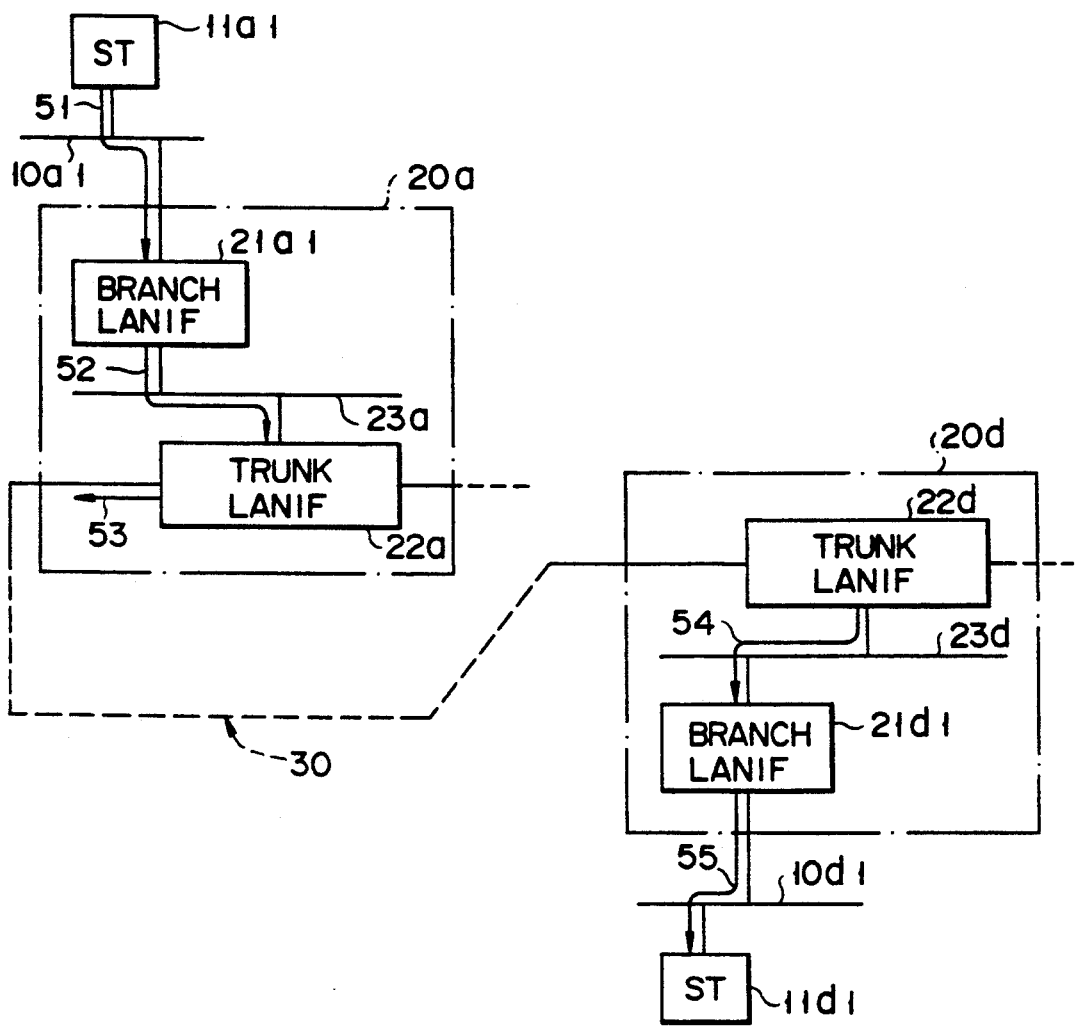
FIG. 4 is a view for explaining a flow of a message exchanged between stations through a trunk LAN.
Figure 5:
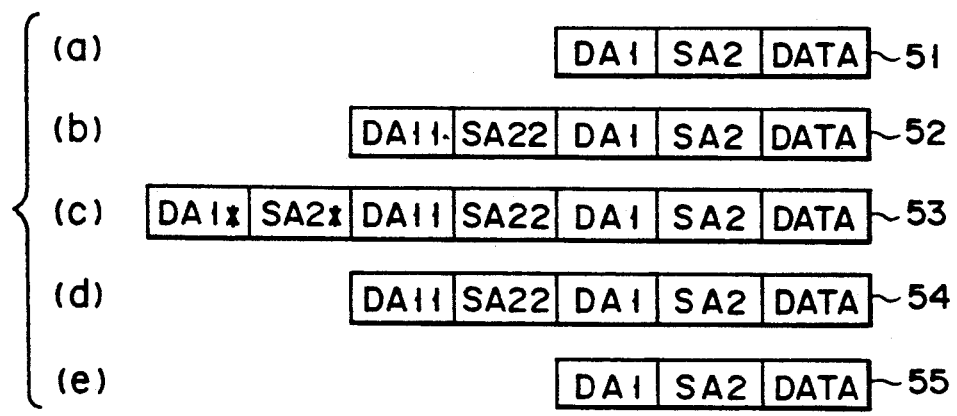
FIG. 5 is a view showing formats of messages on transmission lines shown in FIG. 4.

FIG. 4 is a block diagram for explaining a flow of a message transmitted from the ST $11_{a1}$ on the branch LAN $10_{a1}$ to the ST $11_{d1}$ of the branch LAN $10_{d1}$, as shown in FIG. 1. FIG. 5 is views showing formats of messages on transmission lines shown in FIG. 4. Referring to FIG. 5, a message 51 transmitted from the ST $11_{a1}$ to the branch LAN $10_{a1}$ has a destination station address DA1 representing a station address of the destination ST $11_{d1}$, a source station address SA2 representing a station address of the source ST $11_{a1}$, and data DATA representing the content of the message.

A message 52 transmitted from the branch LANIF $21_{a1}$ on the branch LAN $10_{a1}$ to the trunk LANIF $22_a$ includes a destination bridge port address DA11 representing a bridge port address of the destination trunk LANIF $22_{a1}$, in and a source bridge port address SA22 representing a bridge port address of the source branch LANIF $21_{a1}$, in addition to the contents of the message 51.

A message 53 transmitted from the trunk LANIF $22_a$ to the LANIF $22_d$ through the trunk LAN 30 includes a bridge port address DA1* of the destination trunk LANIF $22_d$ and a bridge port address SA2* of the source trunk LANIF $22_a$, in addition to the contents of the message 52. A check by the address translation table is not executed for the bridge port addresses DA1* and SA2*.

A message 54 transmitted from the trunk LANIF $22_d$ to the branch LANIF $21_{d1}$ has the same contents as those of the message 52. A message 55 transmitted from the branch LANIF $21_{d1}$ to the destination ST $11_{d1}$ through the branch LAN $10_{d1}$ has the same contents as those of the message 51.

Figure 6:
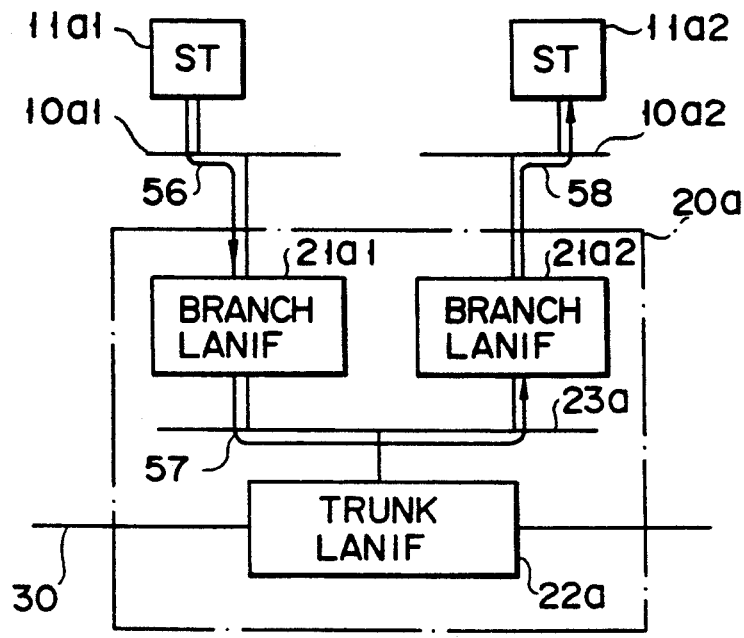
FIG. 6 is a view for explaining a flow of a message exchanged between stations through a bridge unit.
Figure 7:
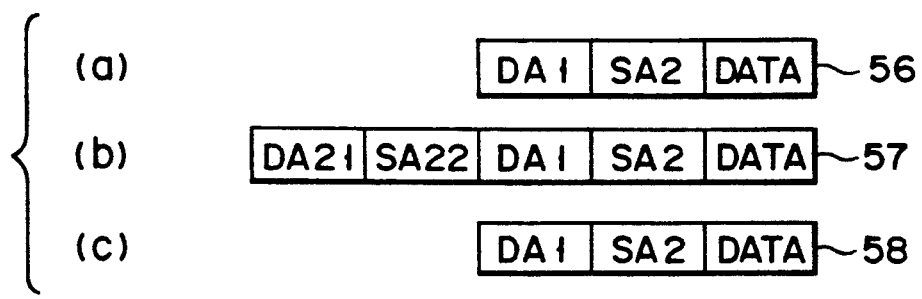
FIG. 7 is a view for explaining formats of messages transmitted on transmission lines shown in FIG. 6.

FIG. 6 is a view showing a flow of a message transmitted from the ST $11_{a1}$ on the branch LAN $10_{a1}$ to the ST $11_{a2}$ on the branch LAN $10_{a2}$, as shown in FIG. 1. FIG. 7 is views showing formats of messages on the transmission lines shown in FIG. 6. As shown in FIG. 7, a message 56 transmitted from the ST $11_{a1}$ to the branch LAN $10_{a1}$ comprises a destination station address DA1 representing a station address of the destination ST $11_{a2}$, a source station address SA2 representing a station address of the source ST $11_{a1}$, and data DATA representing the content of the message.

A message 57 transmitted from the branch LANIF $21_{a1}$ to the branch LANIF $21_{a2}$ includes a destination bridge port address DA21 representing a bridge port address of the destination branch LANIF $21_{a2}$ and a source bridge port address SA22 representing a bridge port address of the source branch LANIF $21_{a1}$, in addition to the contents of the message 56.

A message 58 transmitted from the branch LANIF $21_{a2}$ to the destination ST $11_{a2}$ on the branch LAN $10_{a2}$ has the same contents as those of the message 56.

Figure 8A:
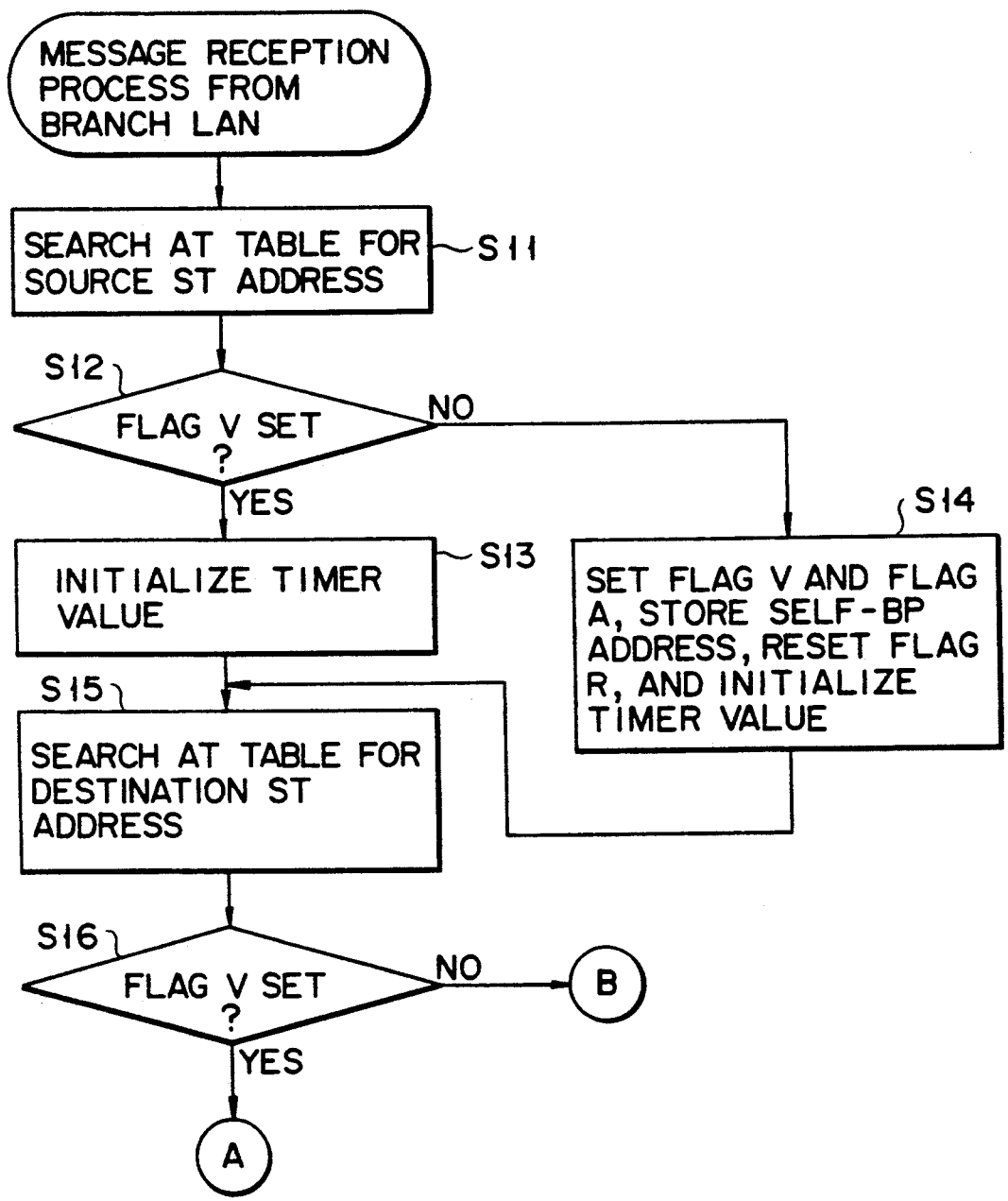
FIGS. 8A and 8B are a flow chart showing message reception processing for receiving a message from a branch LAN in a branch LAN interface.
Figure 8B:
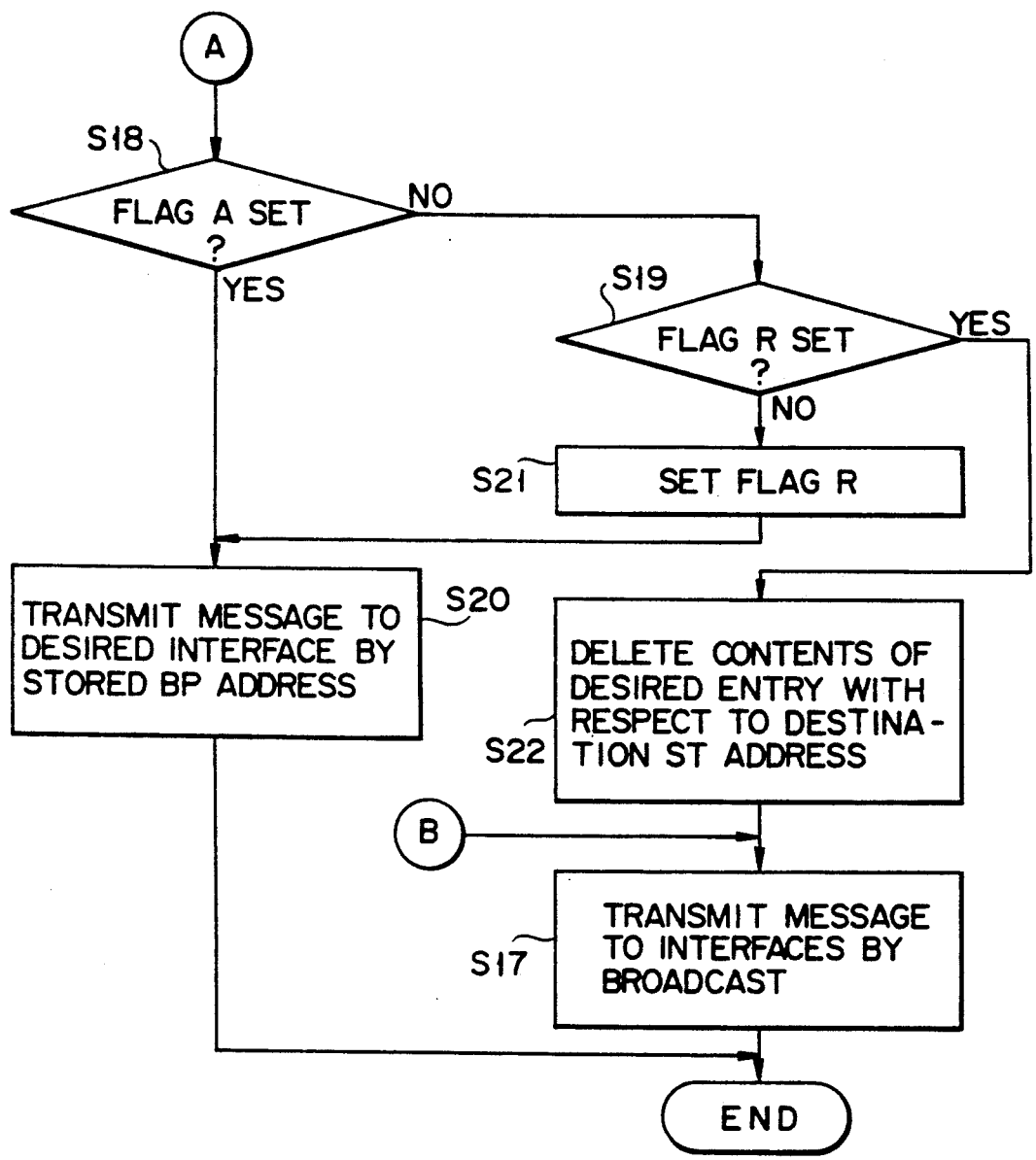

FIGS. 8A and 8B are flow charts showing operations of the processor in the branch LAN interface when the branch LAN interface in each bridge unit receives a message from the branch LAN. Processing contents of steps S11 to S22 are as follows.

In step S11, the address translation (AT) table is searched for a source station (ST) address of a received message.

In step S12, a set/reset state of the flag V is checked in a predetermined entry for the source station address in the AT table. If the flag V is determined to be set, processing in step S13 is performed. However, if the flag V is determined to be reset, processing in step S14 is performed.

In step S13, a timer value of this entry is initialized.

In step S14, the flags V and A in this entry are set, a self bridge port address of a message reception interface is registered as a bridge port address paired with the source station address, and the flag R is reset. In addition, the timer value is initialized.

In step S15, the AT table is searched for the destination station address of the received message.

In step S16, a set/reset state of the flag V is determined in a predetermined entry for the destination station address in the AT table. If the flag V is determined to be set, processing in step S18 is performed. However, if the flag V is determined to be reset, processing in step S17 is performed.

In step S17, a message (the destination address is a broadcast bridge port address, and the source address is a bridge port address of a message transmission interface) is transmitted to all interfaces within the same bridge unit through the internal bus by broadcast.

In step S18, a set/reset state of the flag A is determined in a predetermined entry for the destination station in the AT table. If the flag A is determined to be reset, processing in step S19 is performed. However, if the flag A is determined to be set, processing in step S20 is performed.

In step S19, a set/reset state of the flag R for the destination station in the AT table is determined. If the flag R is determined to be reset, processing in step S21 is performed. However, if the flag R is determined to be set, processing in step S22 is performed.

In step S20, a message (the destination address is a bridge port address registered in the AT table and paired with the destination station address, and the source address is a self-bridge port address of the message transmission interface) is transmitted onto the internal bus in the bridge unit.

In step S21, the flag R in this entry is set.

In step S22, all the contents (address information) in this entry are deleted.

Figure 9:
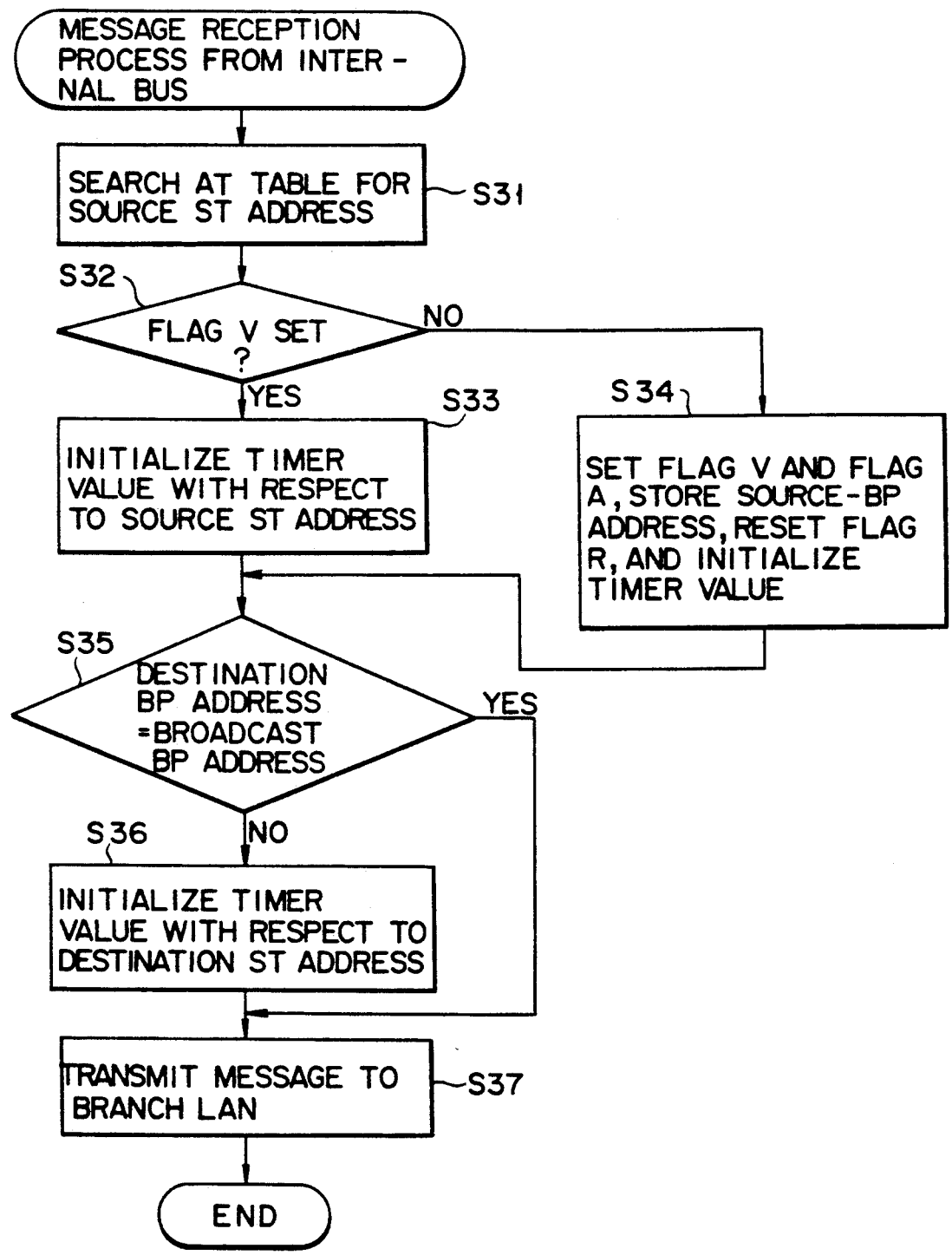
FIG. 9 is a flow chart showing message reception processing for receiving a message from an internal bus in a branch LAN interface.

FIG. 9 is a flow chart showing operations of the processor in the branch LAN interface when the branch LAN interface in each bridge unit receives a message (the destination address is a self-bridge port address of the message reception interface, or a broadcast bridge port address) from the internal bus. The processing contents of steps S31 to S37 are as follows.

In step S31, the AT table is searched for the source station address of the received message.

In step S32, a set/reset state of the flag V is determined in the predetermined entry for the source station address in the AT table. If the flag V is determined to be set, processing in step S33 is performed. However, when the flag V is determined to be reset, processing in step S34 is performed.

In step S33, a timer value in this entry is initialized.

In step S34, the flags V and A in this entry are set, the source bridge port address is set as a bridge port address paired with the source station address, and the flag R is reset. In addition, a timer value is initialized.

It is determined in step S35 whether the destination bridge port address of the received message is a broadcast bridge port address. If the destination bridge port address is determined to be a broadcast bridge port address, processing in step S37 is performed. When the destination bridge port address is determined to be a self-bridge port address of the message reception interface, processing in step S36 is performed.

In step S36, a timer value in the predetermined entry for the destination station address of the received message is initialized in the AT table.

In step S37, this message is transmitted to the branch LAN.

Figure 10:
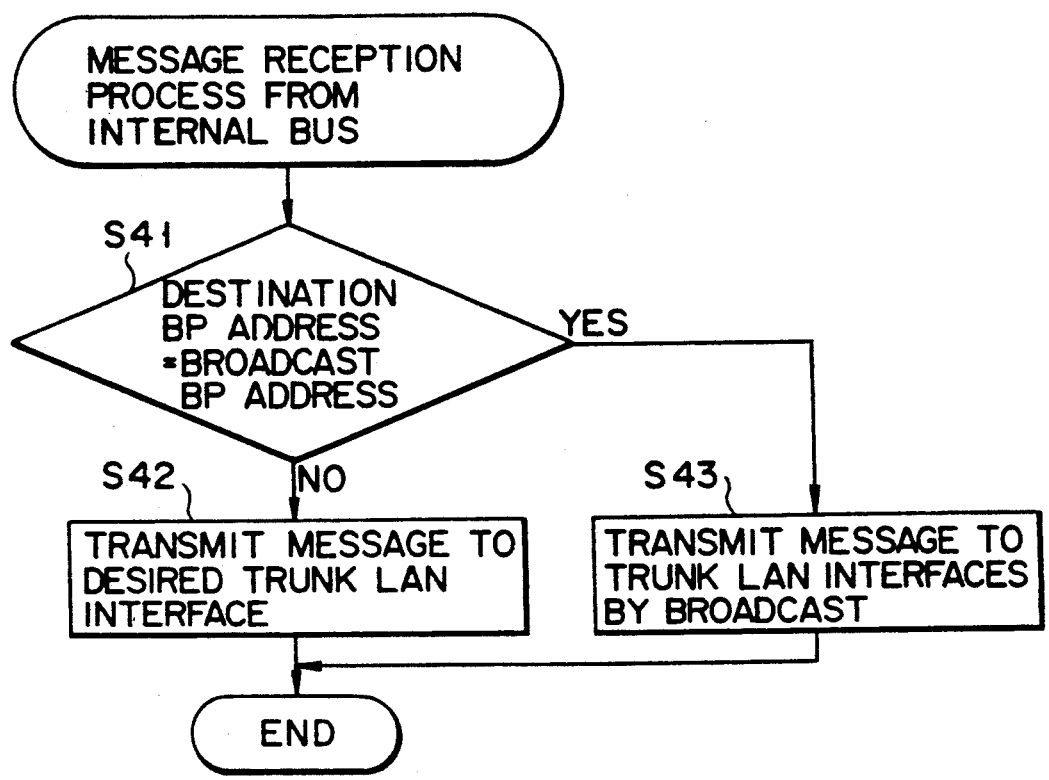
FIG. 10 is a flow chart showing message reception processing for receiving a message from an internal bus in a trunk LAN interface.

FIG. 10 is a flow chart showing operations of the processor of the trunk interface when the trunk LAN interface of each bridge unit receives a message (the destination address is a bridge port address having a bridge address without the self-bridge address of the bridge unit or a broadcast bridge port address) from the internal bus. The processing contents of steps S41 to S43 are as follows.

It is determined in step S41 whether the destination bridge port address of the received message is a broadcast bridge port address. When the destination bridge port address is determined to be a broadcast bridge port address, processing in step S43 is performed. When the destination bridge port address is a bridge port address having a bridge address without the self-bridge address of a message reception bridge unit, processing in step S42 is performed.

In step S42, a message to which the destination and source bridge port addresses are added is transmitted onto the trunk LAN 30.

In step S43, a message to which the broadcast bridge port address is added is transmitted to the trunk LAN 30.

Figure 11:
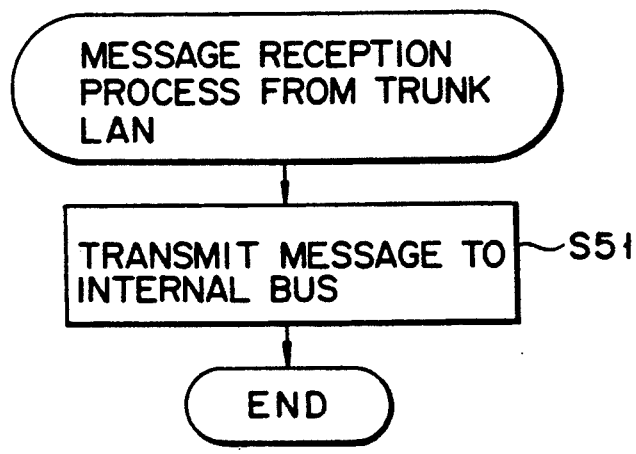
FIG. 11 is a flow chart showing message reception processing for receiving a message from a trunk LAN in a trunk LAN, interface.

FIG. 11 is a flow chart showing operations for the processor of the interface when the trunk interface of each bridge unit receives a message (the destination message is a bridge port address having a self-bridge address of the message reception bridge unit, or a broadcast bridge port address) from the trunk LAN. In step S51, a message except for the bridge port address added by the source trunk LAN interface is transmitted to the internal bus in the bridge unit.

FIG. 12 is a block diagram for explaining a flow of the first message transmitted from the ST $11_{a1}$ on the branch LAN $10_{a1}$ to the ST $11_{d1}$ on the branch LAN $10_{d1}$ in the network system shown in FIG. 1.

A message 61 is the first message transmitted from the ST $11_{a1}$ to the branch LAN $10_{a1}$ and destined to the ST $11_{d1}$, and has the same format as in the message in FIG. 5(a). Messages $62_a$ and $62_{a2}$ are broadcast messages respectively transmitted from the trunk LANIF $22_a$ and the branch LANIF $21_{a1}$ to the trunk LAN 30 and the branch LAN $10_{a2}$ after the bridge unit $20_a$ receives the message 61. The messages $62_a$ and $62_{a2}$ have the same formats as in those of FIGS. 5(c) and 7(c).

Messages $63_{c1}$ and $63_{c2}$ are broadcast messages transmitted from the branch LANIFs $21_{c1}$ and $21_{c2}$ to the branch LANs $10_{c1}$ and $10_{c2}$ after the bridge unit $20_c$ receives the message $62_a$ and have the same format as in FIG. 5(e).

A message $63_c$ is a relay message from the bridge unit $20_c$ corresponding to the message $62_a$. Messages $64_{d1}$ and $64_{d2}$ are broadcast messages transmitted from the branch LANIFs $21_{d1}$ and $21_{d2}$ to the branch LANs $10_{d1}$ and $10_{d2}$ after the bridge unit $20_d$ receives the message $63_c$ and have the same format as in FIG. 5(e).

A message $64_d$ is a relay message from the bridge unit $20_d$ corresponding to the message $63_c$. Messages $65_{b1}$ and $65_{b2}$ are broadcast messages transmitted from the branch LANIFs $21_{b1}$ and $21_{b2}$ to the branch LANs $10_{b1}$ and $10_{b2}$ after the bridge unit $20_b$ receives the message $64_d$ and have the same format as in FIG. 5(e).

A message $65_b$ is a relay message from the bridge unit $20_b$ corresponding to the message $64_d$.

FIG. 13 is a block diagram for explaining a flow of the nth message from the ST $11_{a1}$ on the branch LAN 10a1 to the ST $11_{d1}$ on the branch LAN $10_{d1}$ in the network system in FIG. 1.

A message 71 is the nth message transmitted from the ST $11_{a1}$ to the branch LAN $10_{a1}$ and destined to the ST $11_{d1}$. A message 72 is a message transmitted from the trunk LANIF $22_a$ to the trunk LAN 30 after the bridge unit $20_a$ receives the message 71. A message 73 is a relay message from the bridge unit $20_c$ corresponding to the message 72. A message $74_{d1}$ is a message transmitted from the branch LANIF $21_{d1}$ to the branch LAN $10_{d1}$ after the bridge unit $20_d$ receives the message 73. A message $74_d$ is a relay message from the bridge unit $20_d$ corresponding to the message 73, and a message 75 is a relay message from the bridge unit $20_b$ corresponding to the message $74_d$.

Transmission of the first message from the ST $11_{a1}$ on the branch LAN $10_{a1}$ to the ST $11_{d1}$ on the branch LAN $10_{d1}$ in the network of this embodiment shown in FIG. 1 will be described below.

The first message 61 is transmitted from the ST $11_{a1}$ to the branch LAN $10_{a1}$.

The message 61 transmitted from the ST $11_{a1}$ to the branch LAN $10_{a1}$ is received by the connector circuit 45 in the branch LANIF $21_{a1}$ and is stored in the memory 44. Upon reception of this message 61, message reception processing is performed in the processor 41 in the branch LANIF $21_{a1}$ in accordance with the flow charts in FIGS. 8A and 8B.

The AT table 42 is searched for the source station address (i.e., the station address of the ST $11_{a1}$) of the message 61 stored in the memory 44 (step S11). A set/reset state of the flag V in the predetermined entry is determined (step S12). Since the received message is the first message, the source station address is not registered in the predetermined entry of the A table 42, and the flag V is reset. In this case, the flags V and A are set in the predetermined entry of the AT table 42, the station address of the ST $11_{a1}$ included in the received message is registered as the source station address, the self-bridge port address of the branch LANIF $21_{a1}$ is registered as the source bridge port address, the flag R is reset, and the timer value is initialized (step S14).

The AT table 42 is searched for the destination station address (i.e., the station address of the ST $11_{d1}$) of the message 61 stored in the memory 44 (step S15). A set/reset state of the flag V in the predetermined entry is determined (step S16). Since the received message is the first message, the flag V is reset. Therefore, the broadcast message (the destination address is the broadcast bridge port address, and the source address is the self-bridge port address of the branch LANIF $21_{a1}$) having the message 61 is transmitted by broadcast to the respective LAN interfaces in the bridge unit $20_a$ through the internal bus $23_a$ (step S17).

The broadcast message including the message 61 and transmitted from the branch LANIF $21_{a1}$ to the internal bus $23_a$ is received by other interfaces in the bridge unit $20_a$, i.e., the trunk LANIF $22_a$ and the branch LANIF $21_{a2}$. Therefore, the branch LANIF $21_{a2}$ starts message reception processing in accordance with the flow chart in FIG. 9. On the other hand, message reception processing is started in the trunk LANIF $22_a$ in accordance with the flow chart in FIG. 10.

When the broadcast message is received from the internal bus $23_a$ to the branch LANIF $21_{a2}$, the AT table is searched for the source station address (i.e., the station address of the ST $11_{a1}$) of the message 61 included in the broadcast message (step S31). A set/reset state of the flag V in the predetermined entry is determined (step S32). Since the received message is the first message, the source station address is not registered in this predetermined entry, and the flat V is reset. Therefore, the flags V and A are set in this entry, the station address of the ST $11_{a1}$ included in the received message is registered as the source station address, the bridge port address of the branch LANIF $21_{a1}$ included in the received message is registered as the source bridge port address, the flag R is reset, and the timer value is initialized (step S34).

It is determined whether the destination bridge port address included in the received message is a broadcast bridge port address (step S35). When the destination bridge port address is determined to be a broadcast bridge port address, the message 61 included in the received message is transmitted to the branch LAN $10_{a2}$ as a message $62_{a2}$ (step S37). Since the destination of this message $62_{a2}$ is the ST $11_{d1}$ on the branch LAN $10_{d1}$, the ST $11_{a2}$ on the branch LAN $10_{a2}$ does not receive the message $62_{a2}$.

When the broadcast message from the internal bus $23_a$ in the bridge unit is received by the trunk LANIF $22_a$, it is determined whether the destination bridge port address included in the broadcast message is a broadcast bridge port address (step S41). When the destination bridge port address is determined to be a broadcast bridge port address, a message $62_a$ (the destination address is the broadcast bridge address, and the source address is the self-bridge address of the bridge unit $20_a$) is transmitted onto the trunk LAN 30 (step S43). Since the port address is neglected, the destination address is used as the broadcast bridge port address, and the source address is used as the self-bridge address of the bridge unit $20_a$.

The message $62_a$ transmitted from the trunk LANIF $22_a$ of the bridge unit $20_a$ to the trunk LAN 30 is relayed as a message $63_c$ by the trunk LANIF $22_c$. In the trunk LANIF $22_c$, when the message $62_a$ is received from the trunk LAN 30, message reception processing is started in accordance with the flow chart in FIG. 11. Therefore, a broadcast message excluding bridge port addresses of the source and destination trunk LAN interfaces from the received message $62_a$ is transmitted to the internal bus $23_c$ (step S51).

The broadcast message transmitted from the trunk LANIF $22_c$ to the internal bus $23_c$ is received by the branch LANIFs $21_{c1}$ and $21_{c2}$. The branch LANIFs $21_{c1}$ and $21_{c2}$ perform message reception processing in accordance with the flow chart in FIG. 9. As a result of this message reception processing, the flags V and A are set in the predetermined entry for the source station address (i.e., the station address of the ST $11_{a1}$) in the AT table. The station address of the ST $11_{a1}$ is registered as the source station address, and the bridge port address of the branch LANIF $21_{a1}$ is registered as the source bridge port address. The flag R is reset, and the timer value is initialized. The message 61 included in the broadcast message is transmitted from the branch LANIFs $21_{c1}$ and $21_{c2}$ to the branch LANs $10_{c1}$ and $10_{c2}$ as messages $63_{c1}$ and $63_{c2}$. The destination of the messages $64_{c1}$ and $64_{c2}$ is the ST $11_{d1}$ on the branch LAN $10_{d1}$. Therefore, the STs $11_{c1}$ and $11_{c2}$ do not receive the messages $64_{c1}$ and $64_{c2}$.

The message $63_c$ relayed by the trunk LANIF $22_c$ of the bridge unit $20_c$ is relayed as a message $64_d$ by the trunk LANIF $22_d$. In the trunk LANIF $22_d$, when the message $63_c$ is received from the trunk LAN 30, the trunk LANIF $22_d$ performs message reception processing in accordance with the flow chart shown in FIG. 11. The broadcast message excluding bridge port addresses of the source and destination trunk LAN interfaces from the received message $63_c$ is transmitted to the internal bus $23_d$.

The broadcast message transmitted from the trunk LANIF $22_d$ to the internal bus $23_d$ is received by the branch LANIFs $21_{d1}$ and $21_{d2}$. In the branch LANIFs $21_{d1}$ and $21_{d2}$, the flags V and A are set in the predetermined entry for the source station address (i.e., the station address of the ST $11_{a1}$) in the AT table. The station address of the ST $11_{a1}$ is registered as the source station address, and the bridge port address of the branch LANIF $21_{a1}$ is registered as the source bridge port address. The flag R is reset, and the timer value is initialized. In addition, the message 61 included in the received broadcast message is transmitted from the branch LANIFs $21_{d1}$ and $21_{d2}$ to the branch LANs $10_{d1}$ and $10_{d2}$ as messages $64_{d1}$ and $64_{d2}$. Therefore, the ST $11_{d1}$ on the branch LAN $10_{d1}$ can receive a message $64_{d1}$ having the ST $11_{d1}$ itself as the destination station and the ST $11_{a1}$ as the source station.

The message $64_d$ relayed by the trunk LANIF $22_d$ is received by the trunk LANIF $22_b$ and is relayed by the trunk LANIF $22_b$ as a message $65_b$. The subsequent operations of the bridge unit $20_b$ are the same as those of the bridge unit $20_c$.

When the message $64_{d1}$ (the destination is the ST $11_{d1}$ itself and the source station is the ST $11_{a1}$) is received by the ST $11_{d1}$, a response message having the station address of the ST $11_{d1}$ itself as the source station address and the station address of the ST $11_{a1}$ (i.e., the source station address of the received message $64_{d1}$) as the destination station address is transmitted to the branch LAN $10_{d1}$.

The response message transmitted to the branch LAN $10_{d1}$ is received by the branch LANIF $21_{d1}$. The branch LANIF $21_{d1}$ starts the message reception processing in accordance with the flow charts in FIGS. 8A and 8B.

In this case, the flag V is reset in the predetermined entry for the source station address (i.e., the station address of the ST $11_{d1}$) in the AT table. Therefore, the flags V and A in this entry are set, and the source station address (i.e., the station address of the ST $11_{d1}$) of the received response message and the self-bridge port address of the branch LANIF $21_{d1}$ are registered. In addition the flag R is reset and the timer value is initialized.

At the time of reception of a broadcast message including a message having the ST $11_{a1}$ as the source station and the ST $11_{d1}$ as the destination station, the flags V and A for the destination station address (i.e, the station address of the ST $11_{a1}$) are set in the predetermined entry in the AT table. Therefore, a response message having the bridge port address of the branch LANIF $21_{a1}$ registered in this entry for the destination station address as the destination bridge port address and the self-bridge port address of the branch LANIF $21_{d1}$ as the source bridge port address is transmitted to the internal bus $23_d$.

The response message (the destination is the branch LANIF $21_{a1}$) transmitted from the branch LANIF $21_{d1}$ to the internal bus $23_d$ is received by only the trunk LANIF $22_d$. The trunk LANIF $22_d$ starts message reception processing in accordance with the flow chart in FIG. 10.

In this case, the destination bridge port address in the received response message is not the broadcast bridge port address, but is the bridge port address of an interface without the trunk LANIF $22_d$. A message having the bridge address of the bridge unit $20_a$ as the destination address and the bridge address of the bridge unit $20_d$ as the source address is transmitted to the trunk LAN 30. Since the port address is neglected, the bridge port address of the branch LANIF $21_{a1}$ is used as the destination address, and the self-bridge port address of the trunk LANIF $22_d$ is used as the source address.

The response message transmitted from the trunk LANIF $22_d$ of the bridge unit $20_d$ to the trunk LAN 30 is relayed by the bridge unit $20_b$ and is received by the trunk LANIF $22_a$ of the bridge unit $20_a$. The trunk LANIF $22_a$ performs message reception processing in accordance with the flow chart in FIG. 11. A message excluding the destination and source bridge port addresses for the trunk LAN interface from the received response message is transmitted to the internal bus $23_a$.

The response message (the destination is the branch LANIF $21_{a1}$) transmitted from the trunk LANIF $22_a$ to the internal bus $23_d$ is received by only the branch LANIF $21_{a1}$. The branch LANIF $21_{a1}$ starts message reception processing in accordance with the flow chart in FIG. 9

In this case, since the flag V for the source station address (i.e., the station address of the ST $11_{d1}$) is reset in the predetermined entry in the AT table, the flags V and A are set in this entry. The station address of the ST $11_{d1}$ in the received message is registered as the source station address, and the bridge port address of the branch LANIF $21_{d1}$ is registered as the source bridge port address. In addition, the flag R is reset, and the timer value is initialized.

It is determined whether the destination bridge port address of the received message is a broadcast bridge port address. In this case, since the destination bridge port address is the bridge port address of the branch LANIF $21_{a1}$, the timer value in the predetermined entry for the destination station address (i.e., the station address of the ST $11_{a1}$) included in the received message is initialized in the AT table. A message excluding the destination and source bridge port addresses for the branch LAN interface from the received message is transmitted to the branch LAN $10_{a1}$ Therefore, the ST $11_{a1}$ on the branch LAN $10_{a1}$ can receive the response message for the ST $11_{a1}$.

As described above, when the first message is transmitted from the ST $11_{a1}$ to the ST $11_{d1}$ and the response message of the first message is transmitted from the ST $11_{d1}$ to the ST $11_{a1}$, a pair of the station address of the ST $11_{a1}$ and the bridge port address of the branch LANIF $21_{a1}$ and a pair of the station address of the ST $11_{d1}$ and the bridge port address of the branch LANIF $21_{d1}$ are registered in the AT tables of the branch LANIFs $21_{a1}$ and $21_{d1}$ connected to the branch LANs $10_{a1}$ and $10_{d1}$. The next message transmission/reception can be directly performed between the STs $11_{a1}$ and $11_{d1}$. Unless the STs $11_{a1}$ and $11_{d1}$ fail or are moved, the message is not transmitted to branch LANs without the predetermined branch LAN.

The nth message transmission/reception between the STs $11_{a1}$ and $11_{d1}$ will be described below.

When an nth message 71 for the ST $11_{d1}$ is transmitted from the ST $11_{a1}$ to the branch LAN $10_{a1}$, the message 71 is received by the branch LANIF $21_{a1}$ in the bridge unit $20_a$. In the branch LANIF $21_{a1}$, the source and destination station addresses of the received message 71 are already registered in a predetermined entry of the AT table, and the flags V and A are already set in this entry. A message having the bridge port address (i.e., the bridge port address of the branch LANIF $21_{d1}$) registered and paired with the destination station address as the destination bridge port address is transmitted to the internal bus $23_a$.

The message transmitted to the internal bus $23_a$ is received by only the trunk LANIF $22_a$. The bridge addresses of the bridge units $20_d$ and $20_a$ as the destination and source addresses are added to the received message. The message to which these addresses are added is transmitted as a message 72 from the trunk LANIF $22_a$ to the trunk LAN 30.

The message 72 transmitted from the trunk LANIF $22_a$ in the bridge unit $20_a$ to the trunk LAN 30 is relayed by the bridge unit $20_c$ and is received by the trunk LANIF $22_d$ in the bridge unit $20_d$ as a message 73. A message excluding the destination and source addresses added by the trunk LANIF $22_a$ is transmitted from the trunk LANIF $22_d$ to the internal bus $23_d$.

The message (the destination is the branch LANIF $21_{d1}$) transmitted to the internal bus $23_d$ is received by only the branch LANIF $21_{d1}$, and a message excluding the destination and source bridge port addresses for the branch LAN interface is transmitted to the branch LAN $10_{d1}$ as a message $74_{d1}$.

AT table update processing in a branch LAN interface shown in FIG. 1 will be described with reference to FIG. 14.

FIG. 14 is a flow chart showing AT table update processing in the branch LAN interface. This update processing is performed by the processor 41 for every interrupt from the timer 43 every predetermined time interval.

In step S61, a head entry number of the AT table 42 is loaded in an address register (not shown). In step S62, an entry represented by the entry number loaded in the address register is referred to, thereby checking whether the flags V and A of the referred entry are set (step S63).

If the flags V and A are determined in step S63 to be set, the timer value of the referred entry is decremented by one (step S64). It is then checked whether the decremented timer value is zero (step S65).

When the timer value is zero in step S65, it is determined that the content (address information) of the referred entry has not been utilized to in message transmission for a predetermined period of time. The flag A of this entry is reset (step S66). Since the flag V is already set, and the content of the referred entry is not deleted. That is, although the content of the referred entry is valid, since this entry has not been utilized for the predetermined period of time, the content of this entry is subjected to deletion.

When processing in step S66 is executed or when the timer value is determined in step S65 not to be zero, it is determined whether the current entry number loaded in the address register is the final entry number (step S67). If the current entry number is determined in step S67 not to be the final entry number, the current entry number is incremented by one (step S68), and processing in step S62 is performed again. However, when the current entry number is determined to be the final entry number, the update processing of the AT table 42 is completed.

In this embodiment, when at least one of the flags V and A is determined to be reset in step S63, the flag A is reset (step S66). Since only the flag V is not reset in a normal state, if NO in step S63, processing in step S67 can be performed without going through step S66.

When a message has not been transmitted or received to or from the ST $11_{d1}$ on the branch LAN $10_{d1}$ for a predetermined period of time, the timer value in the entry for the station address of the ST $11_{d1}$ becomes zero in the AT table update processing, and the flag A is reset. In this state, assume a message is transmitted from the ST $11_{a1}$ to the ST $11_{d1}$, and this operation will be described below.

A message transmitted to the branch LAN $10_{al}$ is received by the branch LANIF $21_{a1}$ in the bridge unit $20_a$, and the branch LANIF $21_{a1}$ starts message reception processing in accordance with the flow charts in FIGS. 8A and 8B.

Flags V for the source station address (i.e., the station address of the ST $11_{a1}$) and the destination station address (i.e., the station address of the ST $11_{d1}$) are set in the predetermined entries of the AT table of the branch LANIF $21_{a1}$. A set/reset state of the flag A in this entry for the destination station address is determined. Since the flag A is reset, a set/reset state of the flag R is determined. Since the flag R is reset, the flag R is set.

A message (the destination address is the bridge port address of the branch LANIF $21_{d1}$ registered in the predetermined entry, and the source address is the self-bridge port address of the branch LANIF $21_{a1}$) is transmitted to the internal bus $23_a$. The subsequent message flow is the same as that described with reference to FIG. 13. The message from the ST $11_{a1}$ is transmitted to the branch LAN $10_{d1}$ through the trunk LAN 30 and the branch LANIF $21_{d1}$.

When the ST $11_{d1}$ as a destination of the message from the ST $11_{a1}$ is connected to the branch LAN $10_{d1}$ in a normal state, the destination ST $11_{d1}$ can receive the message transmitted from the ST $11_{a1}$. The ST $11_{d1}$ transmits a response message to the ST $11_{a1}$ upon reception of the message from the ST $11_{a1}$.

When the destination ST $11_{d1}$ is moved from the branch LAN $10_{d1}$ to another branch LAN, the source ST $11_{a1}$ cannot receive a response message. In this case, the message is retransmitted from the ST $11_{a1}$ to the ST $11_{d1}$. The message retransmitted from the ST $11_{a1}$ is received by the branch LANIF $21_{a1}$ in the bridge unit $20a$. Therefore, the branch LANIF $21_{a1}$ starts the message reception processing in accordance with the flow charts in FIGS. 8A and 8B.

In this case, at the time of previous message transmission, the flag R is set in the predetermined entry for the destination station address (i.e., the station address of the ST $11_{d1}$) in the AT table. Therefore, all the content (address information) of this entry is deleted, and the message is transmitted by broadcast.

As a result, when the destination ST $11_{d1}$ is connected to another branch LAN, the ST $11_{d1}$ receives a message from the branch LAN currently connected thereto. The ST $11_{d1}$ can transmit a response message to the source ST $11_{a1}$.

According to the present invention, as described above, address information associated with a station not subjected to message transmission and reception for a predetermined period of time is not immediately deleted from the AT table. When a message is to be transmitted to a station represented by the station address included in this address information, the message is transmitted first to the destination station by using this address information. When a response message is not received from this destination station, the address information is deleted from the AT table, and the message is retransmitted by broadcast. Therefore, when a message is not transmitted or received for a predetermined period of time due to a low frequency of utilization of a destination station, a message can be transmitted by using address information which is deleted in a conventional network system. In this manner, a message is not transmitted to branch LANs not associated with the current message transmission. In addition, since a message can be efficiently transmitted to a destination station, an increase in load of the network system can be prevented.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A network system comprising:
   at least one trunk network;
   a plurality of branch networks, each having at least one station;
   a plurality of trunk interfaces, each of the trunk interfaces being coupled to the trunk network;
   a plurality of branch interfaces, each of the branch interfaces being coupled to one of the branch networks; and
   a plurality of buses for coupling at least one of the trunk interfaces to at least one of the branch interfaces, and
   wherein each of the branch interfaces includes:
   a table for registering a plurality of address information;
   means for determining address information which designates a station in which at least one of no message transmission and no message reception is executed during a predetermined period;
   means for transmitting a message to the station which is designated by the determined address information when the message to be transmitted to the station which is designated by the determined address information is a first message; and
   means for deleting the determined address information from the table and transmitting the message in a broadcast manner when no response message to the first message is received.

2. The system according to claim 1, wherein each of the trunk and branch interfaces further includes memory means for storing a message to be received.

3. The system according to claim 1, wherein the address information includes a first flag representing whether or not the address information is to be deleted from the table, and a second flag representing whether or not the first message is transmitted to a station which is designated by the determined address information.

4. The system according to claim 3, wherein when the first flag is set, the message is at least one of transmitted to a station which is designated by the determined address information and transmitted in a broadcast manner in accordance with a set/reset state of the second flag.

5. A method for managing address information utilized in message transmission and reception, the method comprising the steps of:

registering a plurality of address information;

determining address information which designates a station in which at least one of no message transmission and no message reception is executed during a predetermined period;

transmitting a message to the station which is designated by the determined address information when the message to be transmitted to the station which is designated by the determined address information is a first message; and deleting the determined address information from a table and transmitting the message in a broadcast manner when no response message to the first message is received.

6. The method according to claim 5, wherein the address information includes a first flag representing whether or not the address information is to be deleted, and a second flag representing whether or not the first message is transmitted to a station which is designated by the determined address information.

7. The method according to claim 6, wherein when the first flag is set, the message is at least one of transmitted to a station which is designated by the determined address information and transmitted in a broadcast manner in accordance with a set/reset state of the second flag.

8. A network system comprising:
at least one trunk network;
a plurality of branch networks, each having at least one station; and
a plurality of interface means for coupling the trunk network to the branch networks, and
wherein each of the interface means includes:
register means for registering a plurality of address information;
means for determining address information which designates a station in which at least one of no message transmission and no message reception is executed during a predetermined period;
means for transmitting a message to the station which is designated by the determined address information when the message to be transmitted to the station designated by the determined address information is a first message; and
means for deleting the determined address information from the register means and transmitting the message in a broadcast manner when no response message to the first message is received.

9. The system according to claim 8, wherein each of the interfaces further includes memory means for storing a message to be received.

10. The system according to claim 8, wherein the address information includes a first flag representing whether or not the address information is to be deleted from the register means, and a second flag representing whether or not the first message is transmitted to a station which is designated by the determined address information.

11. The system according to claim 10, wherein when the first flag is set, the message is at least one of transmitted to a station which is designated by the determined address information and transmitted in a broadcast manner in accordance with a set/reset state of the second flag.

* * * * *